United States Patent [19]
Snow et al.

[11] Patent Number: 6,125,111
[45] Date of Patent: Sep. 26, 2000

[54] ARCHITECTURE FOR A MODULAR COMMUNICATIONS SWITCHING SYSTEM

[75] Inventors: Harold J. Snow, Nepean; Edmund Wong, Ottawa; Anatoly Tarsky; Bruce I. Barkhouse, both of Nepean, all of Canada

[73] Assignee: Nortel Networks Corporation, Montreal, Canada

[21] Appl. No.: 08/721,095

[22] Filed: Sep. 27, 1996

[51] Int. Cl.[7] .................................................. H04J 3/02
[52] U.S. Cl. .................................... 370/360; 370/386
[58] Field of Search ..................................... 370/357, 358, 370/359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 438, 439, 522, 535, 536, 537

[56] References Cited

U.S. PATENT DOCUMENTS

| | | | |
|---|---|---|---|
| 3,649,763 | 3/1972 | Thompson | 370/372 |
| 4,146,749 | 3/1979 | Pepping et al. . | |
| 4,228,536 | 10/1980 | Gueldenpfennig et al. . | |
| 4,254,498 | 3/1981 | Tawara et al. . | |
| 4,317,008 | 2/1982 | Athenes et al. | 370/375 |
| 4,527,012 | 7/1985 | Caplan et al. . | |
| 4,764,921 | 8/1988 | Graves et al. | 370/100 |
| 4,876,682 | 10/1989 | Graves et al. | 370/66 |
| 4,970,721 | 11/1990 | Aczel et al. . | |

FOREIGN PATENT DOCUMENTS 0 451 400 A2  10/1991  European Pat. Off. ....... H04Q 11/04

OTHER PUBLICATIONS

Holland H G et al. "The 5ESS–2000 Switch: Exceeding Customer Expectations" AT&T Technical Journal. vol. 73, No. 6, Nov. 1, 1994, pp. 28–37, XPOOO476706.

Hornbach B H et al: "5ESS–2000 Switch: The Next Generation Switching System" AT&T Technical Journal, vol. 72, No. 5, Sep. 1, 1993, pp. 4–12, XP000425021.

*Primary Examiner*—Huy D. Vu

[57] ABSTRACT

An architecture for a modular communications system is disclosed. The modular communications system comprises at least one control module; a plurality of resource modules for receipt of external payload data provided to said system or for manipulation of the payload data; a plurality of resource module links, one link connecting each resource module to the control module and each resource module. The control module comprises a switch for switching payload data between the plurality of resource modules; and a bandwidth allocator comprising a bandwidth selector and a distributor each connected to the switch and to the resource module links. The bandwidth selector allows the selection of the bandwidth of payload data passed from any of the resource modules to the time switch. Similarly, the bandwidth distributor allows for the selection of the bandwidth of payload data switched through the switch and provided to any of the resource modules from the control module. Preferably, all the resource module links are electrically isolated from each other. The architecture provides for the modular assembly of a telecommunications offering varied capacities, redundancies and services.

44 Claims, 5 Drawing Sheets

ARCHITECTURE FOR A MODULAR COMMUNICATIONS SWITCHING SYSTEM

FIELD OF THE INVENTION

This invention relates, generally, to communications switching systems and, more particularly, to an architecture for a modular communications switching system.

BACKGROUND OF THE INVENTION

Communications switching systems, particularly as used in telephony communications, typically employ a modular architecture to effect distributed processing. The architecture of a conventional telecommunications switching system generally comprises a central control unit coupled to a time division multiplexed ("TDM") switching network which in turn is communicatively coupled to a peripheral subsystem. Moreover, conventional architecture allows the systems to provide high levels of availability, even in the presence of failures of one or more components.

Typically, a central control unit is responsible for controlling the TDM switching network to process telephone calls and for directing, in general, the operation of the switching system.

The peripheral subsystem functions to provide a physical interface between the switching system and an external world consisting of subscriber lines and trunks within a telecommunications network. Examples of such known physical interfaces are DS-1, PCM-30, STS-1 and OC-3 interfaces. The peripheral subsystem usually further provides a variety of signal processing functions, including, for example, tone generation and reception, echo cancelling, support for various messaging formats and protocols, and the like.

Conventional peripheral subsystems are generally designed to fulfill generally predetermined and specific requirements for the switching system. Consequently the types, capacity and redundancy of the particular physical interfaces and signal processing functions that may be provided by the peripheral subsystem are generally predetermined and limited and may not be readily varied once the switching system has been manufactured. For example, the maximum number of subscriber lines that may be connected through a physical interface to the switching system is determined while designing the system. Similarly, the maximum ratio of signal processing resources to subscriber lines in the system is also generally predetermined. Therefore, the ability to allow for modular growth of the switching system is limited: the switching systems, capacities may not be easily varied and expanded as required. Moreover, conventional peripheral subsystem do not allow for flexible redundancy of system components in the event of component failure with means for coordinating their operation to minimize the impacts of such failure.

Additionally, in conventional subsystems many components providing signal processing and external interfacing are typically electrically interconnected to each other. Failure of a single component is thus often difficult to isolate and may affect the functioning of other components.

It is an object of the present invent ion to overcome some of the disadvantages of known communications systems.

SUMMARY OF THE INVENTION

In accordance with the present invention, there is provided, a modular communications system comprising a control module; a plurality of resource modules for receipt of external payload data provided to said system or for manipulation of received payload data; a plurality of resource module links, one link connecting each resource module to said control module and said each resource module; said control module comprising a switch for switching payload data between said plurality of resource modules; a bandwidth allocator comprising a bandwidth selector and a bandwidth distributor each connected to said switch and to said resource module links; said bandwidth selector for selecting the bandwidth of payload data passed from any of said resource modules to said time switch; and said bandwidth distributor for selecting the bandwidth of payload data switched through said switch and provided to any of said resource modules from said control module.

In accordance with another aspect of the present invention, there is provided a modular communications system comprising: a first switching individual channels of payload data between a first switch input and a first and a first switch output, each channel having a fixed bandwidth; a second switch for switching groups of channels of payload data, between a second switch input and a second switch output, each group of channels provided to said second switch input from a link, and comprising an integer number of at least two individual channels of payload data; a third switch for switching groups of channels of payload data between a third switch input and a third switch output, each group of channels comprising an integer number of at least two individual channels of payload data; said second switch output interconnected with said first switch input, to provide payload data from said second switch to said first switch; said first switch output interconnected with said third switch input, to provide payload data from said first switch to said third switch; a plurality of resource modules each connected with at least one of said links to said second switch to provide payload data to said second switch, and to said third switch to receive payload data from said third switch.

In accordance with yet another aspect of the present invention there is provided a modular communications system comprising: a control module; a plurality of resource modules, each resource module for at least one of i) receipt of payload data provided to said system; and ii) manipulation of received payload data; a plurality of resource module links, one link connecting each resource module to said control module; said control module comprising a switch for switching payload data between said plurality of resource modules; means for selecting a bandwidth of payload data to pass from each of said resource modules to said switch; means for distributing payload data from said switch to any of said resource modules.

In accordance with yet a further aspect of the present invention there is provided a modular communications system comprising: first means for switching individual channels of payload data between a first input and a first output, each channel having a fixed bandwidth; second means for switching groups of channels of payload data, between a second input and a second output, each group provided to said second input from a link and comprising an integer number of individual channels of payload data; third means for switching groups of channels of payload data, between a third input and a third output; said second output interconnected with said first input, to provide payload data from said second means for switching to said first means for switching; said first interconnected with said third input, to provide payload data from said first means for switching to said third means for switching; a plurality of resource modules each connected with at least one of said links to said second means for switching to provide payload data to said second means for switching, and to said third means for switching to receive payload data from said third means for switching.

In accordance with yet a further aspect of the present invention there is provided a method of switching data between a plurality of active and redundant resource modules in a communications system comprising a first, second and third switch, said method comprising the steps of: a. providing groups of channels of payload data from said active and redundant resource modules to said second switch; b. at said second switch, switching groups of channels of payload data from active resource modules to said first switch; c. at said first switch, switching individual channels of payload data at said first switch to said third switch; d. at said third switch, switching groups of payload data including payload data provided by said first switch, to said active and redundant resource modules, each group comprising an integer number of at least two individual channels of payload data.

BRIEF DESCRIPTION OF THE DRAWINGS

The invention will be better understood from the following description of a modular architecture of a communications system together with reference to the accompanying drawings, in which.

DETAILED DESCRIPTION

Figure 1:
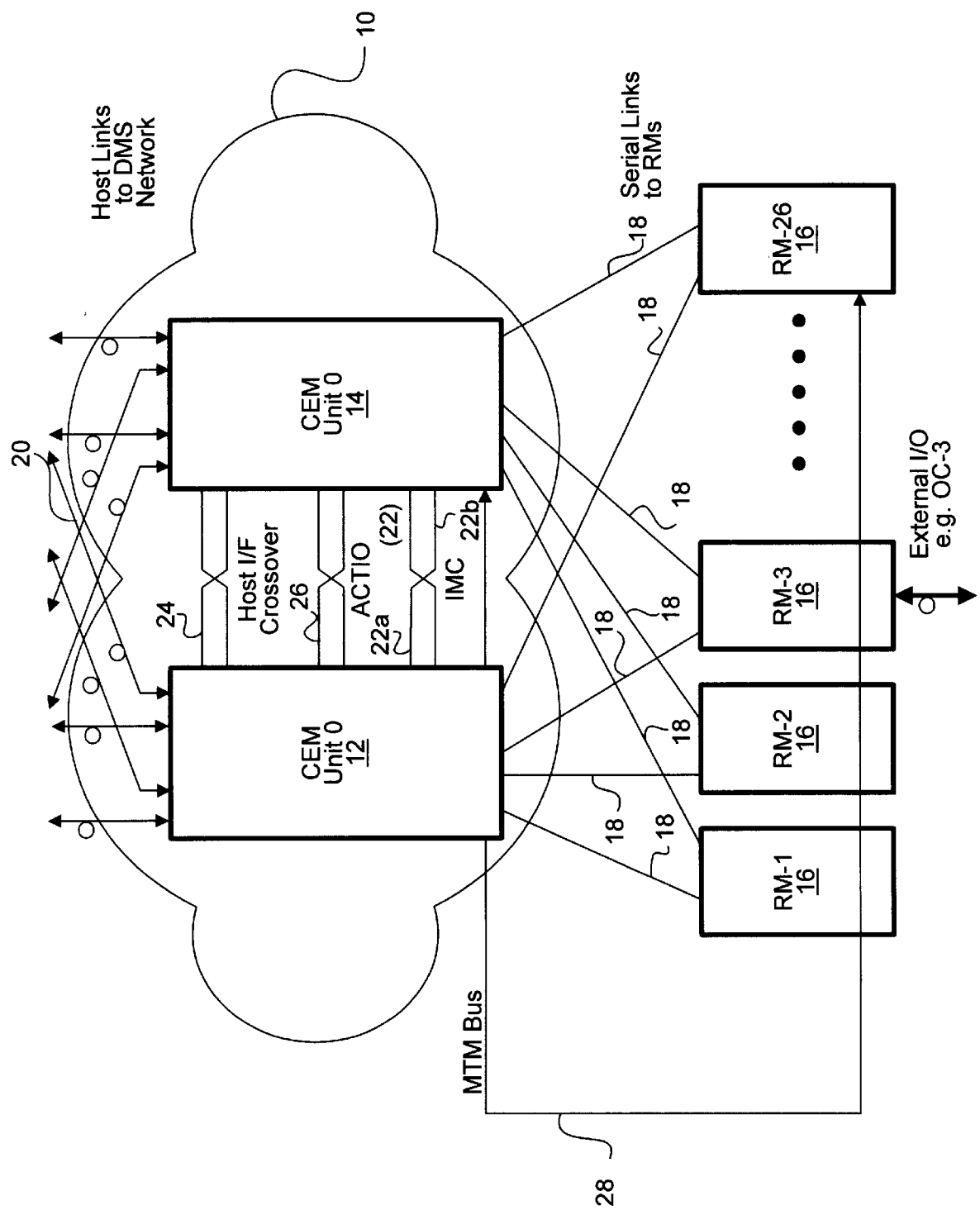
FIG. 1 is a block diagram of the architecture of a communications system in accordance with an aspect of the present invention.

FIG. 1 illustrates the architecture of a modular communications system. A common equipment module ("CEM") complex 10 comprises two CEMs 12, 14 (control modules). The two CEMs are interconnected to each other. Each control module 12, 14 is connected to a plurality of resource modules 16 ("RMs") by way of resource module links 18. The resource module links 18 are also referred to as S-Links.

In this embodiment, up to twenty-six RMs may be connected to CEM complex 10 by S-links 18. Of course, a larger number of resource modules could be connected to an appropriately scaled system in accordance with the invention.

Each resource module link 18 is electrically isolated from every other resource link 18, effecting point to-point connectivity between RMs 16 and CEMs 12, 14. This allows for the isolation and easy detection of module failures. The ambiguity in the location of a fault is limited to at most 2 modules and the link between them.

The two CEMs 12, 14 operate in redundancy. One CEM (12 or 14) is active, while the other remains inactive. Inactive CEM (14 or 12) is normally in standby mode ready to become active in the event of a failure on the presently active CEM (12 or 14). The exchange of activity is governed by software and hardware in each CEM 12, 14 and is termed a "SWACT" (SWitch of ACTivity).

Similarly, RMs 16 can be provisioned with various redundancy schemes, as required. One RM may serve as a redundant RM for one or more active RMs. In the event of a failure of an active RM payload data may be switched through a redundant RM. RM sparing is controlled by the CEMs. The CEM incorporate circuitry to efficiently manage the transfer of payload data from a failed RM to a spare.

CEMs 12, 14 may further be interconnected to higher nodes in a host communications system (for example "DMS" switch equipment) by way of host interface 20 for the exchange of data with the host system. This allows the communications system to function as a peripheral subsystem. Of course, the communications system need not be connected to the host and may function as a stand-alone communications system.

CEM complex 10 is the center for overall control and coordination of the communications system. Complex 10 co-ordinates the setup and takedown of connections between PMs 16 or between RMs 16 and host interface 20, in response to requests from a host communications system (not shown). Complex 10 further allocates and de-allocates system resources to calls and call events and coordinates resource module sparing operations and diagnostic operations.

RMs 16 supply payload processing capabilities to the communications system. The number and type of RMs 16 required is application and provisioning dependent. RMs 16 can be broadly categorized by the type of resource they supply:

interface (e.g. OC-3 Carrier);

pulse code modulation services (e.g. tone detection & generation, echo cancelling);

messaging services (e.g. HDLC message format translation); or computing services.

This modular design allows a communications system having specific functionalities to be assembled from a small set of generalized components (ie. RMs and CEM). To provide sufficient and scalable control processing, distributed computing techniques are employed, with each RM 16 having its own processing capability and performing local low-level control functions under supervision of a central control component (ie. a CEM 12, 14). Thus, telecom functions are physically separated into control, interface, signalling and service modules. The alignment of the physical and logical partitioning allows the various functions to be efficiently mixed in different combinations with minimal new development. The architecture allows for efficient utilization of the switching function of CEMs 12, 14 and RMs 16 by providing a means by which the amount of payload data exchanged with RMs 16 can be varied to match the requirements of a particular service circuit implementation, as more particularly described below.

CEMs 12, 14 are interconnected to each other by way of intermodule communications ("IMC") link 22; host data cross-over interface 24; and activity arbitration link 26.

IMC link 22 transports a set of signals used to exchange messaging data between CEMs 12 and 14. This facility allows software on an inactive CEM to track operation of software in the active CEM, thus keeping state data in the inactive CEM in alignment with that of the active CEM.

Host link 20 provides redundant communications signals between the communications system equipment and higher nodes in a host system These signals are used to carry payload data (e.g. PCM voice); messaging to other components of the host communications system which typically comprises DMS switch equipment; and clocking information. One CEM module provides one set of host links, while the other CEM module provides a redundant set.

Additionally Activity Input/Output signals are exchanged between CEMs via link 26 to arbitrate for CEM Activity. As noted, only one CEM 12 or 14 is active at any time. The inactive CEM cannot disturb operation of the active CEM.

Resource module links 18 (or S-links) between the CEMs and resource modules are serial links that, transport payload voice and data bytes between the CEM complex 10 and the RMs 16;

transport the system clock from tile CEM complex 10 to RMs 16;

transport the CEM activity state from the CEM complex 10 to RMs 16;

transport low-level control (including RM reset control) from the CEM complex 10 to the RMs 16, and low level status from the RMs 16 to the CEM complex 10;

transport high level control and status between the CEM complex 10 and the RMs 16 (messaging);

detect the presence or absence of an RM 16 by the CEM complex 10; and detect transport errors induced by electrical noise or other mechanisms.

All RMs 16 share a common interface definition (S-Link) to the CEMs 12, 14. The maximum available payload bandwidth to an RM can be increased by replicating the S-Link interface as required. This enhances provisioning flexibility by limiting the number of distinct physical RM interface slot types.

Additionally, al; resource and control modules are interconnected by way of a common module test and maintenance bus ("MTM" ) 28, for transferring certain diagnostic and control information between modules.

MTM bus 28 allows the active CEM 12 or 14 or external test equipment to initiate hardware tests of the communications system components. In addition, MTM bus 28 can be used at the factory to store initial software loads in nonviolative storage on communications system components. MTM bus 28 is also used during operation to control visual indicators on each system component. MTM bus 28 is based on the known Joint Test Action Group (JTAG) 1149.5 specification.

Figure 2:
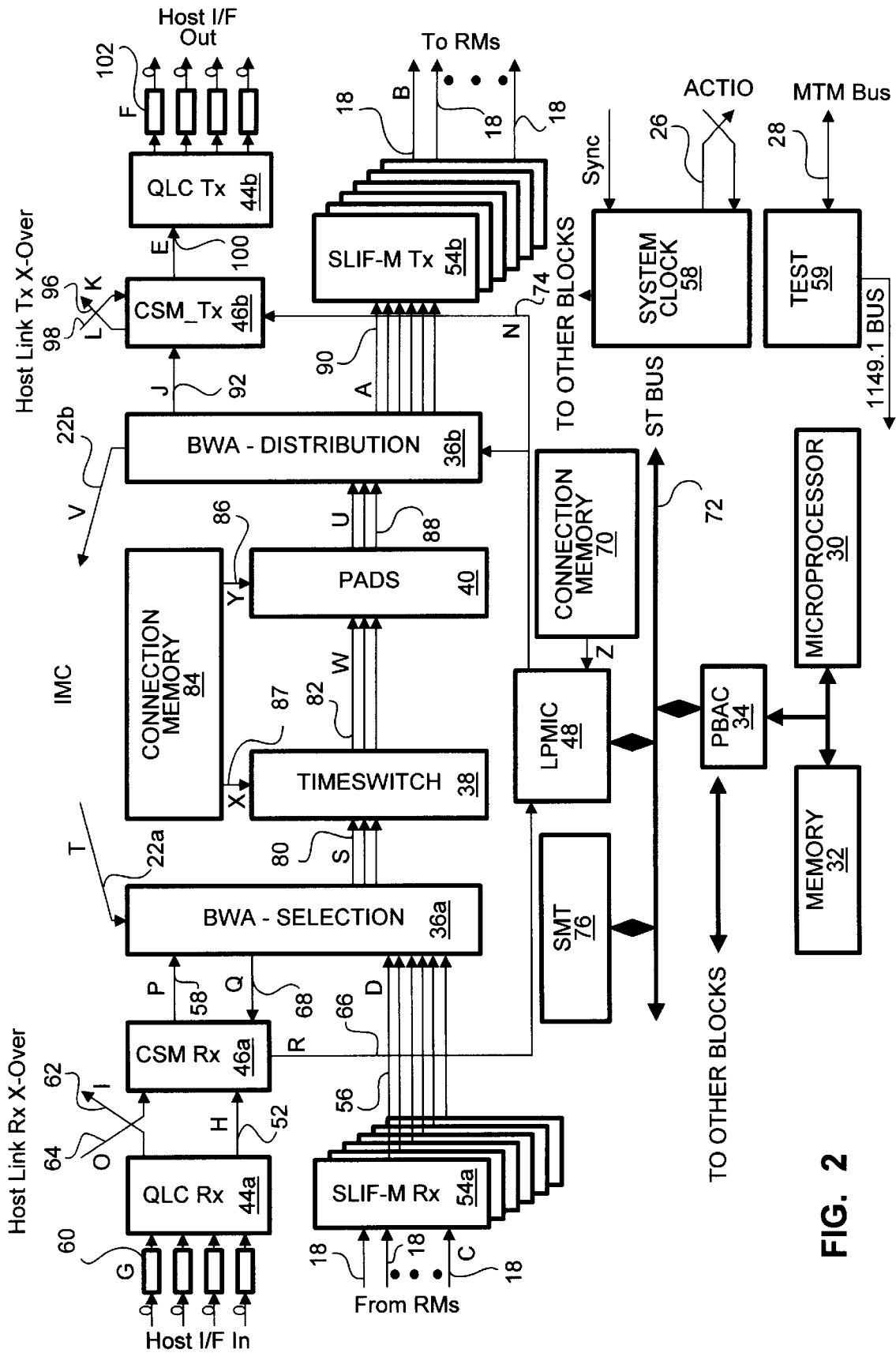
FIG. 2 is a block diagram of the architecture of a component of the communications system of FIG. 1.

A functional block diagram of CEM 12 or 14 is showrn in FIG. 2. Each CEM 12, 14 comprises a microprocessor 30 with associated data and program memory 32, and a Processor Bus Access Chip 34 ("PBAC") application specific integrated circuit ("ASIC"). PBAC 34 distributes the processor address and data signals to the other devices on the module so that the processor can control the other devices.

Clock 58 provides a clock signal for the CEM. The clock of the active CEM acts as the system clock 58 for the communications system. A system clock signal flows from the CEM complex 10 to the RMs 16 via S-links 18. The clock of the inactive CEM is synchronized to the clock of the active CEM. In addition, system clock 58 can be synchronized to the Host Interface 20 or a particular RM 16.

Intelligent Teat Master ("ITM") device 59 operates under supervision of the microprocessor 30 to control scan test and Built In Self Test (BIST) operations for CEMs 12 and 14 as well as tests of other modules by interfacing with the MTM bus 28.

Each COM 12, 14 contains a switching matrix which allows payload data timeslots to be connected between the host interface and the RMs 16, or between RMs 16. Additionally, each CEM 12, 14 provides a facility to relay control and status messages between the host interface 20 and RMs 16 or between RMs 16.

Each matrix is comprised of a bandwidth allocator 36a, 36b ("BWA") and a time division multiplex switch 38.

Time switch 38 provides a payload switching function with 1 timeslot resolution.

Each timeslot comprises 8 bits of payload data, a spare bit and a parity bit (typically odd parity). Each timeslot may transport payload data (i.e. voice); overhead data; signalling information; or messaging information.

EWA 36a, 36b comprises a bandwidth selector 36a and bandwidth distributor 36b. The bandwidth selector 36a and the bandwidth distributor 36b each comprise their own matrix. Bandwidth selector and bandwidth distributor matrices have a payload switching function with 32 timeslot resolution.

Also included in the switching matrix is a padding block 40 ("PADS") which allows simple (unary) operations to be performed on the data stream output by timeswitch 38 by means of a set of Look-Up Tables. Each timeslot in the stream can be manipulated separately.

S-Links 18 are connected to the RMs 16 by a set of six S-Link Interface Master (SLIF-M) 54a, 54b devices. The SLIP-M devices 54a, 54b function as an input/output point for transferring payload and control data between the CEM complex 10 and RMs 16. Physically, each S-link 18 is interconnected to a CEM 12, 14 at a single point. For clarity, FIG. 2 illustrates the separate connection points for transferring data from S-links 18 to CEM via SLIF-M 54a, and transferring data from the S-links to the CEM via SLIF-M 54b. The SLIF-M device 54a, 54b is interconnected to the BWA selector 36a and BWA distributor 36b, The selection portion 36a of the BWA collects input payload streams from the host via the host interface 20 arid RMs 16 and presents a selected portion of the total payload capacity to timeswitch 38. The distribution portion 36b of the BWA collects the switched payload from the timeswitch 38 and distributes it to the host interface 20 and RMs 16.

The host interface 20 connects the CEM complex 10 to a host communications system (not shown). Host interface 20 is comprised of a quad link controller ("QLC") 44a, 44b and channel supervisory message ("CSM") device 46a, 46b. QLC device 44a, 44b functions as an input/output point for transferring payload and messaging data between the CEM complex 10 and other components of the host equipment.

The communications system also uses processor to processor messaging to exchange control and status information between RMs 16, CEMs 12, 14 and/or a host. Messaging functions are supplied by two devices. The Link Protocol Message Interface Chip ("LPMIC") 48 translates messages between the payload stream and the processor memory. The system mapper/tracer ("SMT") 50 is an optional device which permits message routing without processor intervention and provides a mechanism by which the processor can trace message flow within the system.

The LPMIC 48 serves to transfer messaging data between the microprocessor 30 and the payload data stream, which is subsequently routed by the BWA 36a, 36b and other devices. It terminates up to thirty-two messaging ports, using known DMS™ messaging protocols. Each port communicates via an exchanye of data with a similar port at the other terminating end.

As noted above, RMs 16 supply payload processing capabilities for the communications system and RMs 16 can be broadly categorized by the type of resource they supply interface; PCM services; messaging services; or computing services. The number and type of RMs 16 required is application and provisioning dependent.

Figure 3:
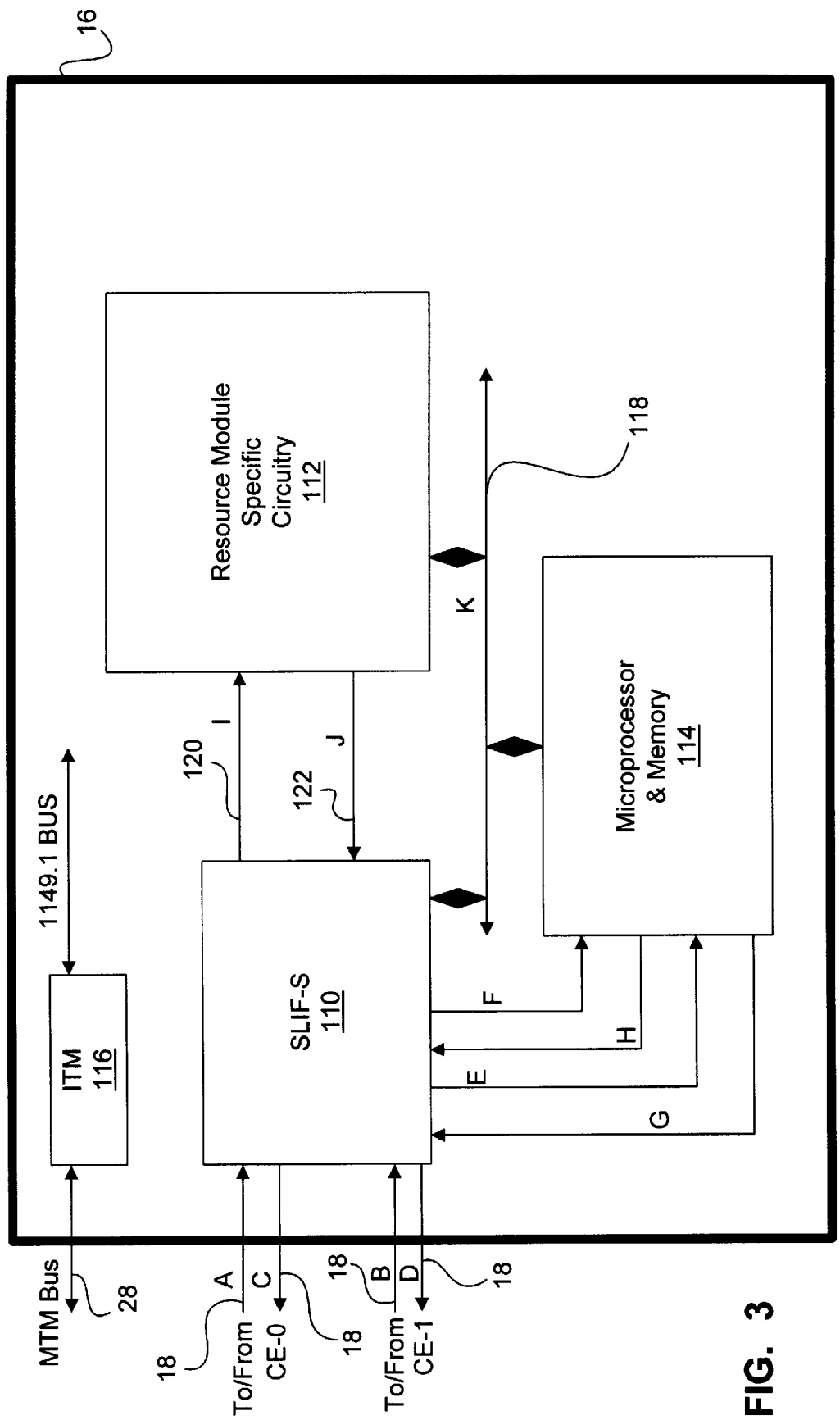
FIG. 3 is a block diagram of the generic architecture of a further component of the communications system of FIG. 1.

FIG. 3 illustrates the generic architecture of an RM. In order to allow for the flexible configuration of the communications system; RM sparing; and a uniform interface between RMs and the CEM complex 10, all RMs should conform to this architecture.

Each RM 16 comprises a serial link interface slave (SLIP-S) device 110. SLIF-S device 110 functions as an input/output point for transferring payload and control data between the CEM complex 10 and the RMs 16. SLIF-S device 110 interconnects to S-links 18, and ultimately connects to SLIF-M devices 54a, 54b of CEMs 12 and 14. SLIF-S device 110 is additionally interconnected to module specific circuitry 112 which implements processing functions of RM 16.

Additionally, each RM 16 also comprises its own microprocessor and memory 114 to interact with the SLIF-S device 110 and the module specific circuitry. Moreover, the RM processor 114 is able to communicate with both active and inactive CEMs. Normally, however, the software on the microprocessor 114 responds solely to message requesting operations in the payload data of originating with the active CEM.

Each RM 16 also comprises an ITM device 116 connected to the MTM bus 28 and an 1149.1 test bus on RM 16. Under commands on the MTM bus 28 (provided by the active CEM 12, 14) diagnostic and self-test can be invoked on components of RM 16.

Figure 4:
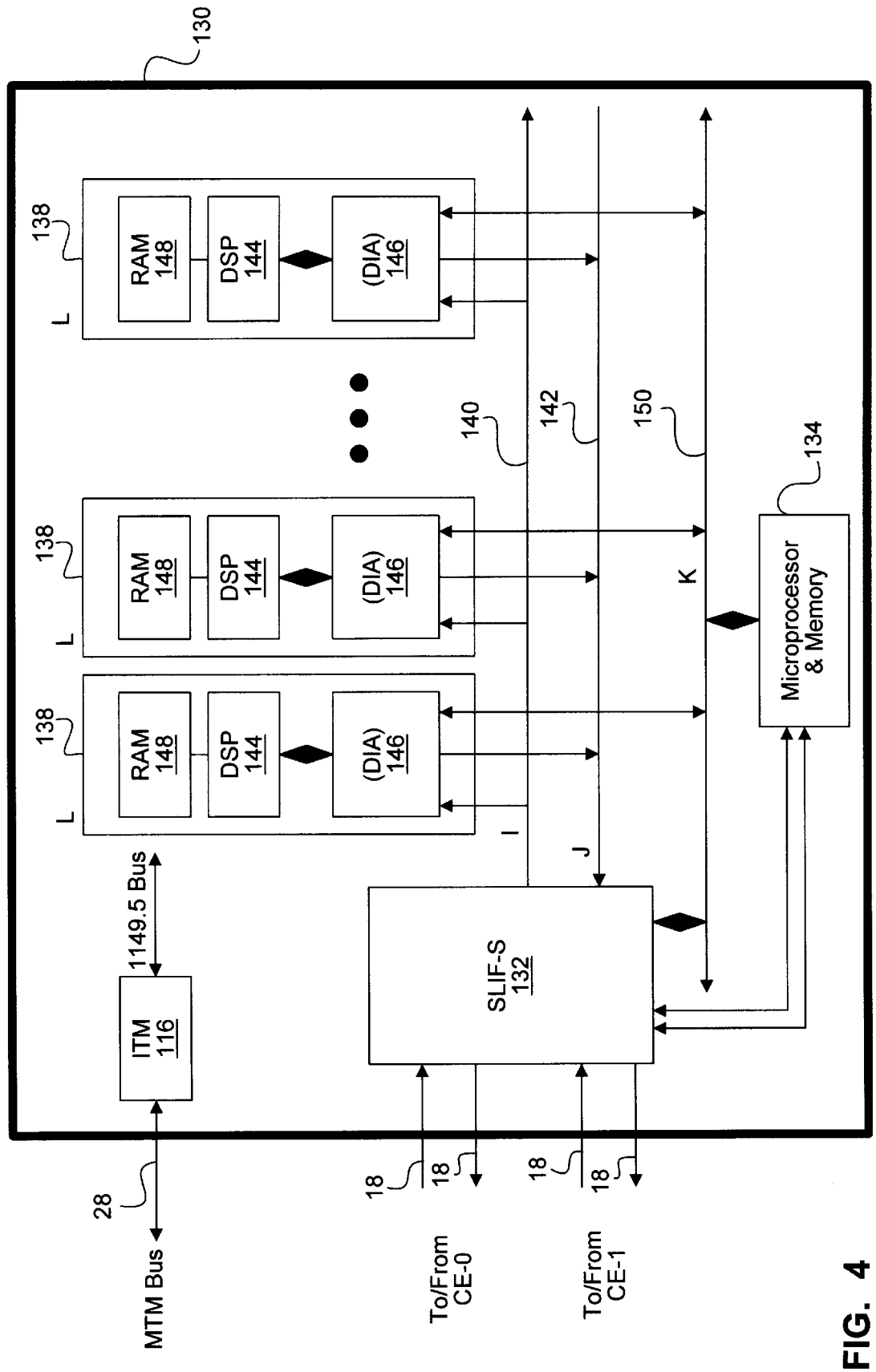
FIG. 4 is a block diagram of a signal processing resource module for use with the communications system of FIG. 1.

FIG. 4, illustrates the architecture of a digital signal processing ("DSP") RM 130, for use with the communications system. Consistent with generic RM architecture, the DSP RM 130 comprises SLIF-S device 132, interconnected to microprocessor and memory 134.

The DSP RM 130 provides digital signal processing capability to the communications system, capable or operating on channels of payload DS0s data. Functionality is, of course, dependent on software contained on DSP RM 130. Typically, the DSP RM is employed for, tone generation, such as DTMF, MF, Dialtone, etc;
tone detection, such as DTMF, MF, Special Tones;
AB Bit Generation; or
AB Bit filtering and scanning.

Possible future DSP functions include voice recognition; voice playback; and data compression/decompression.

For DSP RM 130, the resource module specific circuitry 136 consists of a number of DSP Islands 138 operating on the payload data provided via bus 140 and 142. Each DSP island 138 consists of a DSP processor 144 with associated Random Access Memory (RAM) 148 and an interface device (DIA) 146. DIA devices 146 select and buffer payload data incoming via bus 13S and present it to DSP processor 144 for access by the DSP software. Payload data generated by the DSP processor 144 is buffered by DIA 146 and output on the outgoing payload bus 142. The capabilities of DSP RM 130 can be scaled by varying the quantity of DSP islands 138, and the type of DSP processor 144.

The DSP RM 130 Further comprises microprocessor 134 which messages with, and downloads software to, the DSP processors 144 via the DIA devices 146 and processor bus 150. Typically, these messages instruct the DSP processors 144 to enable or disable a service or query the results of a service such as tone detection, and would be issued by the microprocessor in response to a message received from CEMs 12, 14.

The communications system implements two types of DSP RMs: a general purpose DSP and a high capacity VSP (Voice Services Processor). The general purpose DSP and VSP differ only in the quantity and type of the DSP islands 138. The VSP provides computationally intensive digital signal processing capability for use with the communications system and operates on payload DS0 channels of data. Functionality is dependent on software contained on the VSP RM. A typical application would be to supply Echo Cancelling capability.

Figure 5:
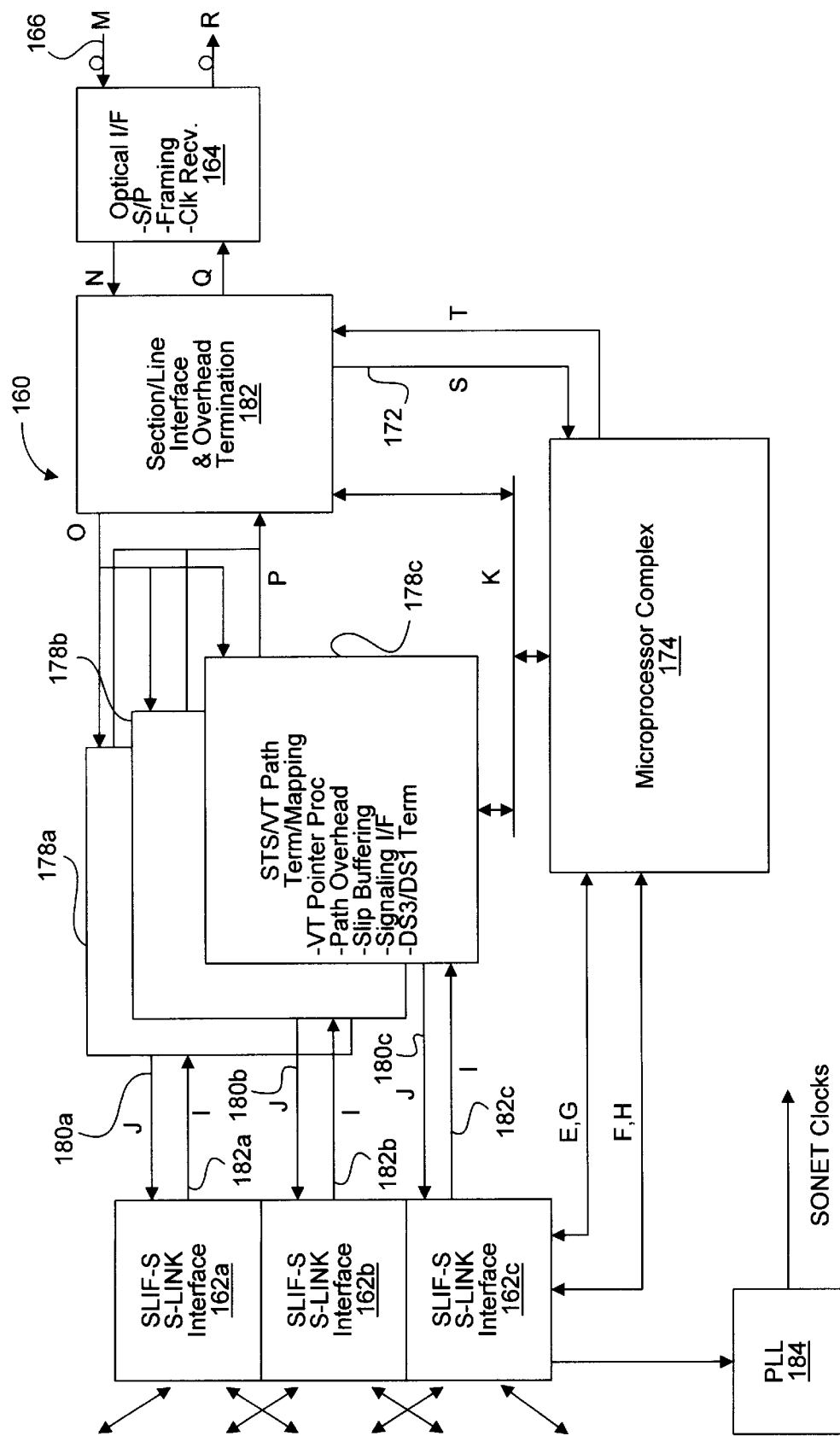
FIG. 5 is a block diagram of an interface resource module for use with the communications system of FIG. 1.

FIG. 5, further illustrates the architecture of an OC-3 interface RM. This RM supplies a SONET intra-office interface at the known OC-3 rate (155.52 Meg Bits per second). Typical applications would be to supply a trunk interface or interface to an Integrated Digital Loop Carrier (IDLC).

The OC-3 RM performs:
Electrical/Optical conversion;
SONET clock recovery and framing;
SONET line and section overhead generation and termination;
mapping of DS3 and constituent DS1s into SONET;
mapping of DS1s into SONET VT1.5 Synchronous format;
DS1 framing (up to 84 DSls);
mapping of DS0s into SONET VT1.5 Byte Synchronous format;
napping of DS0s into DS1 format;
slip buffering of DS0s to align witty communications system clock;
signalling bit (ABCD bit) Extraction and Insertion;
performance monitoring at all carrier levels;
supplying a reference signal to the CEM complex to synchronize the Spectrum system clock to the incoming OC-3 carrier; and
local diagnostics and loopback control.

OC-3 RM 160 is capable of terminating the full voice payload (2016 DS0S) in various formats including, Asynchronously Mapped VT1.5s; Bytesynchronously Mapped VT1.5s and Asynchronously mapped DS3s.

To achieve the required payload bandwidth, OC-3 RM 160 comprises three SLIF-S devices 162a, 162b, 162c with associated S-Link clusters, one for each STS-1 component of the OC-3 signal.

These three SLIF-S devices are interconnected with one of the three Path Termination blocks 178a, 178b, 172c via busses 180a, 180b, 180c, 182a, 182b, 182c. Each block assembles twenty-eight VT1.5s or one DS3 from the payload datastream, using the overhead payload timealots to generate the AB signalling bits if required.

The Path Termination blocks 178a, 178b, 178c are further interconnected to Section and Line Overhead Termination block 182 where SONET Section and Line overhead data are added as per SONET specifications. Data for the outgoing Section and Line Data Communications Channels are supplied by microprocessor 174 which controls overall operation of the OC-3 RM. Optical Interface block 164 serializes and converts data to optical form.

Clocks to drive the SONET mapping circuitry are generated by Phase Locked Loop ("PLL") 184, which is locked to the frame rate of the active CEM (12 or 14).

In operation, the communications system switches payload and messaging data between a CEMs 12, 14; a host communications system (not shown); and a plurality orf RMs 16.

Data is received by the system via the host communications system and/or via those RMs 16 having external links. These external links may be telephone subscriber lines or trunks to other switches. The data received by the system is typically channelized in multiple DS0 (64 kbps) data channels.

Referencing FIG. 5, for data received by an OC-3 RM, an incoming optical OC-3 signal is received by optical interface 164 via optical link 166 and converted to electrical form. A clock waveform is extracted by optical interface 164. The frame indicator is located, and the data converted to byte wide parallel form.

The parallel data is passed to section/line termination block 182 via bus 168. In section and line overhead termination block 182, the overhead bytes are processed according to known SONET specifications. Data from Section and Line Data Communications channels is extracted, and presented to the OC-3 RM microprocessor 174 via bus 172. The payload data from each STS-1 component of the datastream is forwarded to one of three identical path Termination blocks 178a, 178b, 178c. Each block operates on one STS-1 component signal in either DS3 or VT1.5 format. The path termination blocks 178a, 178b, 178c complete the process of extracting DS0s from VT1.5s or DS3s and pass the resulting parallel stream of timeslots (J) to the SLIF-S devices 162a, 162b, 162c. Signalling data (AB bits) are extracted and passed as overhead payload timeslots to SLIF-S devices 162a, 162b, 162c via bus 180a, 180b, 180c. The individual DS1 or VT1.5 components are slip buffered to align them with the communications system frame rate.

The payload data provided to SLIF-S devices 162a, 162b, and 162c is then provided to the CEMs over S-links 18. Additionally, software executing on the OC-3 RM microprocessor 174 monitors the carrier signals for alarm conditions, and notifies the CEM processors 30 of alarm events by messaging through the SLIF-S interface 162a, 162b, 162c via bus 175 and bus 177.

Data received by the system from the host is provided to the CEM complex 10 (FIG. 2) via host link 20 to the QLC 44a. QLC 44a receives four serial streams of 512 twelve bit timeslots per frame each from four Optical/Electrical conversion modules 60. Within this data, the QLC 44a locates a frame identifier and monitors the cyclic redundancy check characters for errors. QLC 44a performs serial to parallel conversion on the four data streams and converts the twelve bit data streams to ten bit streams (12B10B decoding). In order to align each stream to the CEM system clock 58, QLC 44a performs a slip buffer operation of each data stream. The slip buffer deletes or duplicates entire intact frames of data if required to align the payload stream to the CEM clock 58. On reading the data from the slip buffer, QLC 44a interleaves the four streams to create a unified stream of 2048 timeslots per frame (ten bits per timeslot) to be forwarded to CSM device 46a via bus 52. A second, identical, scream is created independently to be forwarded to the CSM device of the mate CEM module (not shown in FIG. 2) via bus 62.

CSM device 46a accepts the stream of ten bit timeslots, 2048 timeslots per frame from the QLC 44a and accepts a similar stream from the QLC device of the mate CEM (not shown) via bus 64. Independently, on both streams, the CSM 46a decodes the channel supervisory message information (messaging data) from each timeslot and makes the results available to microprocessor 30 and creates an output stream of payload data which is provided to the selector portion of BWA 36a via bus 58. The data from the QLC device 44a is selected from the active OEM or the mate CEM on a per-timeslot basis. Data is selected by verifying information present in the received CSM information. If one stream exhibits incorrect CSM information, the other stream is used. The automatic selection process can also be overridden by microprocessor 30 on a per-timeslot basis.

Using the selected stream, CSM 46a creates a further output stream which is provided to LPMRC 48 via bus 66. This output stream is generated by merging data on messaging bus 68 with data from QLC device 44a (via bus 52) or the QLC device of the mate (via bus 64). Selection is on a per-timeslot basis, and is under control of microprocessor 30. The output data stream contains interleaved messaging data from the host interface on the mate (inactive) CEM via bus 64 or bus 52 from host interface 20 via QLC 44a and from RMs 16 and IMC 22a via bus 68 and the inactive CEM via IMC 22.

LPMIC device 48, accepts this data stream of 4096 timeslots per frame from the CSM device 46a via bus 66. This data stream contains messaging information from up to 32 originator ports in other modules. LPMIC 48 then assigns the timeslots to messaging ports, under control of a connection memory 70 initialized by microprocessor 30 and terminates the messaging protocol present on each port, and buffers the received message. The messaging bandwidth of an individual port can be set by assigning the desired number of timeslots to that port. A given port may be assigned up to 2048 timeslots by connection memory—connected to LPMIC 48. Thereafter, LPMIC 48 transfers the received message to the microprocessor's memory 12 via the transaction ST bus 72, using Direct Memory Access ("DMA") techniques.

Upon notification by microprocessor 30, LPMIC 48 also retrieves message data from the microprocessor's memory 32 via ST bus 72, using DMA techniques, and buffers the message data locally. Based on values in the microprocessor's memory, LPMIC 48 directs the message data to one of the 32 messaging ports, but first encodes the message data with the protocol for that port. It outputs the encoded message to the BWA 36b and CSM device 46b via 4096 timeslot bus 74. The assignment of message ports to timeslots on bus 74 is under control of else connection memory 70 initialized by microprocessor 30.

SMT 76 is an optional component which adds message mapping and tracing functionality to the CEM. If SMT device 76 is present, LPMIC 48 can alternatively re-route a received message to the transmit side of another messaging port without intervention by microprocessor 30, thus providing message relay services.

This is accomplished by LPMIC 48 device presenting certain data values in the message (representing a logical endpoint address) to SMa device 76 via the ST bus 72. SMT device 76 then compares the logical address against values stored in a routing table in the device to determine which physical messaging port the message should be routed to. The selected physical port number is then transferred to LPMIC 48 which performs the actual message transfer. In the case where the physical address is the module itself, LPMIC 48 transfers the message to the microprocessor's memory 32 as above. These operations can occur on the ST bus 72 independently of the microprocessor's memory bus. The values in the SMT routing table are initialized by microprocessor 30.

SMT device 76 can also trace message transactions, by observing and recording in a memory buffer addressing information contained in the message data as it is transferred on ST bus 72.

If SMT device 76 is not present, all messages are transferred to microprocessor memory 32, and the above operations may be performed by software by microprocessor 30.

Data provided to the CEM complex 10 from RMs 16 is provided via S-links 18 to SLIF-M device 54a, 54b. Each SLIF-M 54a, 54b device receives 16 serial streams of 256 timeslots per frame each with associated clocks from the RMs 16 via S-links 18, organized as five clusters. Typically one cluster originates with each RM (3 in the case of an OC3 RM).

SLIF-S device (FIG. 3) of each RM providing data to the CEM complex accepts a stream of ten bit parallel data from kM specific circuitry 112. It then creates two identical copies of the payload data. On both copies of the payload data, messaging data is inserted from RM microprocessor 114. The messaging data inserted on both streams need not be identical, SLIP-S device 110 further calculates a cyclic redundancy check for both streams, and converts them to serial format for transmission to both CEMs (one serial data stream to active CEM, and one to inactive REM) via S-links 18.

SLIF-M device 54a, 54b (FIG. 2) of the CEMs receives this is data and locates the frame identifier and verifies the cyclic redundancy check characters for error monitoring purposes; performs a Serial to Parallel conversion on each of the data streams; interleaves the resulting parallel data into a single parallel stream of 4096 timeslots per frame; and outputs this stream to the BWA selection device 36a via bus S6.

Under control of microprocessor 30, the SLIF-M 54a device is capable of looping received data around to the transmit portion of the SLIF-M device 54b for diagnostic purposes. Physically, the receive and transmit portions of the SLIF-M device 54a, 54b are formed in a single ASIC, which facilitates this data looping.

BWA 36a, 36b is implemented in two components (Selection 36a and Distribution 36b). Each component provides a coarse (thirty-two timeslot resolution) data switching facility, operating on payload data to and from the RMa 16 and the host interface 20. It further merges messaging data to and from IMC link 22 and RMs 16 with the payload data.

On the selection side, the BWA 36a accepts data streams from the SLIF-M device 54a containing payload and messaging timeslots via bus 56. It further accepts a data stream from the CSM device 46a via bus 58 containing payload timeslots and generates a new data stream containing payload timeslots which is forwarded to the timeswitch device 38 via bus 80. This stream contains a selected subset of the payload timeslots from the SLIF-M 54a and host interfaces 20. Additionally, the BWA 36a accepts a further data stream containing IMC messaging timeslots from the Distribution side of the BWA on the mate CEM via bus 82. BWA 36a then generates new data stream containing message timeslots from the IMC stream and from the RMs (via SLIF-M 54a and bus 56), which is forwarded to the CSM device 46a via bus 68.

Data from the BWA selection device 36a is provided to timeswitch 38 via bus 80. Within timeswitch 38 the data is written into one of two memory buffers in consecutive memory addresses within the timeswitch. Each buffer can store a full frame of data. Simultaneously, data are read out of the second memory buffer via bus 82, with buffer addresses supplied by a third memory 84 (Connection Memory via bus 87). Within each frame, the buffers exchange functions. The output data is forwarded to the padding function 40. Addressing of connection memory 84 is sequential and repeats every frame. Connection Memory 84 is also accessible by microprocessor 30.

By writing values (buffer addresses) in the connection memory 84, microprocessor 30 causes the timeslot ordering of the output data stream to be rearranged with respect to the ordering of the input stream, thus accomplishing the switching function. The timeswitch is used primarily by call processing software.

The output of the timeswitch is provided to PADS 40 which performs unitary operations on the datastream. Operation is by table look-up. A view data stream is formed by concatenating the payload stream provided via bus 82 with a stream of data from connection memory 84 via bus 86. Connection memory 84 has one location for each timeslot, and is read out sequentially each frame. As noted above, connection memory 84 is accessible by microprocessor 30, so that it may vary the memory contents.

The new data stream passed to PADS 40 via bus 82 may be regarded as having two components: the value from timeswitch 80 (index within a table), and the value from the connection memory 84 (table selection). This data stream is used to address a set of tables stored in Read Only Memory (ROM).

The output data from the ROM is used as the output of PADS 40 and is used as the new (modified) payload data stream. The data values stored in the ROM represent pre-calculated outputs for the following operations:

No change to payload data (Unity Gain)

Various levels of Gain and Attenuation, when the payload data is formatted as Pulse Code Modulation (PCM) voice samples Conversion between the A-Law and u-Law PCM encoding standards.

This data is provided via bus 88 to the distribution side of BWA 36b. The distribution side of BWA 36b accepts the data stream from the PADs block 40 containing payload timeslots via bus 88, it further accepts a data stream via bus 74 containing messaging timeslots from the LPMIC device 48; it generates new data streams containing payload and messaging timeslots which are forwarded to the SLIP-M devices 54b via bus 90. The SWA 36b further generates a new data stream containing payload timeslots which is forwarded to the CSM device via bus 92 and a further new data stream containing messaging timeslots (IMC) which is forwarded to the selection side of the BWA on the mate CEM via bus 94.

Within the BWA 36a, 36b, timeslots from the inputs are written into one of two memory buffers in consecutive memory locations. Bach buffer can store 1/32 of the number of input timeslots per frame. Simultaneously, data is read out from the second buffer. The two buffers exchange functions thirty-two times per frame. Memory addresses for the read operation are supplied by sequentially reading a third memory 84 containing connection instructions. The values in the connection memory 84 can he accessed by microprocessor 30.

By writing values in connection memory 84, microprocessor 30 causes timeslot ordering of the output data stream from BWA 36b to be rearranged with respect to that of the input stream, thereby switching the data contained in the timeslots. Since the connection process is repeated thirty-two times per frame, each parameter in the connection memory is used thirty-two times per frame. Thus the thirty-two timeslots controlled by a given connection parameter are treated as a unit in that all thirty-two affected timeslots are switched identically. Such a collection of timeslots is referred to as a Bandwidth Allocator Group.

As is apparent, these Bandwidth Allocator Groups are interleaved so that one timeslot from each Group is processed by the buffer per exchange time.

Selector portion 36a of the BWA is similarly capable of switching Bandwidth Allocator Groups BWA 36a, 36b is also capable of broadcasting one input group to more than one output group. BWA 36a, 36b is however not capable of rearranging timeslots within a BWA Group.

This switching function of BWA 36a, 36b is used primarily for (1) provisioning (Bandwidth allocation for RMs); and
(2) fault recovery software.

For provisioning operations, the amount of bandwidth allocated to a given RM slot can be adjusted according to the RM's function. This grooming of the bandwidth allows the time division multipped switch 38 have less capacity (handle lear timeslots) than the aggregate payload bandwidth present on buses 56, 50, 42 and 42.

For maintenance or fault recovery operations on RMs 16, the payload bandwidth to and from a given RM can be switched to a spare RM without disturbing the connections in the timeswitch function. Since timeslots are switched in groups of 32 at most ⅟32 of the number of connection parameters that would be required need to be changed, this is faster than performing the equivalent operation in the timeswitch 38. In addition, the operation can be performed without disturbing the connection parameters of the time division multiplexed 38, helping to isolate the maintenance and provisioning software functions from the call processing software functions.

Because the BWA 36a, 36b is a full matrix, as opposed to a data multiplexer, the slot location of the spare PM need not have any special relationship to the working RM. This flexibility allows for 1+1, N+1, and N+M RM sparing configurations. Selection between redundant and active RMs as controlled by microprocessor 30.

As an example of 1+1 RM sparing, consider a resource "X" supplied by RM 16 "A", with an additional RM 16 "s" serving as the spare RM. RM 16 "B" is configured in an identical manner to RM 16 "A", such that working and spare resources "X" from RM 16 "A" and RM 16 "B" respectively are transported in the same timeslots (and therefore corresponding BWA Groups) on S-Links 18.

A sufficient number of timeslots in timeswitch 38 are assigned to make the resources "X" available as call processing functions. The number of timeslots will be a multiple of the BWA Group size (i.e. 32). Microprocessor 30 has set the connection parameters of BWA 36a such that the BWA groups from RM 16 "A" are presented to the timeswitch 28 via datastream 80. Additionally, microprocessor 30 has set the connection parameters of BWA 36b such that the timeslots from the timeswitch 38 corresponding to these resources are presented identically via S-Links 18 to both RM 16 "A" and RM 16 "B". Thus when a call processing connection is made in timeswitch 38 from one of the resources "X", the payload data is selected by BWA 36a from RM 16 "A"; correspondingly when a call processing connection in timeswitch 38 is made to one of the resources "X", the payload data is sent identically by BWA 36b to both RM 16 "A" and RM 16 "B". The resource "X" is thus supplied by RM 16 "A".

When maintenance software executing on microprocessor 30 decides to perform the RM sparing operation, as may happen in the event of a failure of RM 16 "A", it manipulates the connection parameters in BWA 36a such that the BWA groups from RM 16 "B" are presented to timeswitch 38, replacing those previously connected from RM 16 "A". The connection parameters of BWA 36b are not altered. Connections in timeswitch 38 are not altered. The resources "X" said above are now being supplied by RM 16 "B".

As an example of N+1 RM sparing, consider a resource "X" supplied by RM 16 "A", and another resource "Y" supplied by a different RM 16 "B", with yet another RM 16 "C" serving as the spare RM. RM 16 "C" can be configured by software, if required, to be equivalent to either RM 16 "A" or RM 16 "B". Initially, microprocessor 30 has set the connection parameters in BWA 36a such that the timeslots corresponding to resource "X" are presented to timeswitch 38 from RM 16 "A", and the timeslots corresponding to resource "Y" are presented to timeswitch 38 from RM "B". The timeslots from RM 16 "C" are not used, and by virtue of not being connected in SWA 36a do not consume capacity of timeswitch 38. Similarly, microprocessor 30 has configured BWA 36b such that the timeslots from timeswitch 38 corresponding to resource "X" are sent to RM 16 "A", and those for resource "Y" are sent to RM 16 "B". Microprocessor 30 also sets the connection parameters of BWA 36b such that RM 16 "C" receives identical payload data to that of RM 16 "A" or alternatively RM 16 "B". For this example, assume RM 16 "A". Said resources "X" are being supplied by RM 16 "A", and said resources "Y" are being supplied by RM 16 "B".

When maintenance software executing on microprocessor 30 decides to spare RM 16 "B" with RM 16 "C", it first sends a message to RM 16 "C" (via LPMIC 48), instructing the microprocessor 114 present on RM 16 "C" to configure RM 16 "C" to be identical to RM 16 "B". Microprocessor 30 then alters the connection parameters of BWA 36b such that the timeslots from the timeswitch 38 corresponding to the resource "y" are presented identically via S-Links 78 to both RM 16 "B" and RM 16 "C". Payload data destined for resource "Y" is now sent identically to both RM 16 "B" and RM 16 "C". Finally, microprocessor 30 manipulates the connection parameters in BWA 36a such that the BWA groups from RM 16 "C" are presented to timeswitch 38, replacing those previously connected from RM 16 "B" . Connections in timeswitch 38 are not altered. The resources "Y" said above are now being supplied by RM 16 "C". The resources "X" said above are still supplied by RM 16 "A".

Data from the distributor side of the BWA 36b is provided to transmit portion of CSM 46a, 46b. The CSM 46b accepts a stream of 10 bit timeslots, 2048 timeslots per frame from the distribution side of BWA 36b via bus 92. The CSM 116b adds a data stream (Channel Supervisory Message) to one of the bits of each timeslot, according to the requirements of DMS switching equipment. Bach of the 2048 timeslots may have a unique CSM stream. Values for the CSM stream are supplied by microprocessor 30. This stream is merged with data from the Tx message bus 74 by selecting between the payload stream and message bus 74 on a per timeslot basis. CSM 46b then outputs the resulting stream to the mace CEM (not shown) via bus 96, and also to an elastic store mechanism. CSM 46b similarly accepts a stream via bus 98 from the mate CEM (not shown) and applies it to a second elastic store mechanism. The purpose of the elastic store mechanisms is to allow for small misalignments between the frames of the two CEMs 12 and 14. CSM 46b further reads two data streams from the elastic stores and creates an output stream by selecting data from ore elastic store or the other. Normally, data created by the active CEM is used, but this can be over-ridden on a timeslot basis to allow the CEMs to share the output data stream. The resulting data stream is provided to the QLC device 44b via bus 100.

QLC device 44b receives a stream of 2048 interleaved ten bit payload data per frame from the CSM device 44b via bus 100, and converts the stream of ten bit payload data into a stream of twelve bit data (10B12B encoding) suitable for optical transmission. It further adds link overhead bits (Frame identifier and cyclic redundancy check characters for error detection). Moreover, it converts the payload stream into four serialized streams of 512 timeslots per frame each and outputs the serial streams to four Electrical/Optical conversion modules 162 for transmission from the CEM module to the host via host interface 20. The rate of payload transmission is determined by whichever CEM is in the active state.

The distributor portion 36b of BWA 36a, 36b further provides the (Tx) portion of the SLIF-M device 54b a stream of 4096 interleaved ten bit payload data per frame in parallel format via bus 90. The SLIF-M device 54b adds link overhead bits (Frame identifier and Cyclic Redundancy Check characters for error detection); adds information bits indicating the activity state of the CEM; converts the data to sixteen serialized streams of 256 timeslots per frame each, organized as five clusters each of three streams and one cluster of one stream; and outputs the sixteen data streams with associated bit clocks to the RTMs via S-links 78.

At RMB 16 (FIG. 3), the SLIF-S devices 110 receive a datastream containing switched payload and messaging data from each CEM 12, 14 via S-links 18. Up to three S-links form a cluster provided by each CEM to an RM 16. The SLIF-S devices 110 locate and extract frame indicators inserted by the SLIF-M devices 54b from each cluster. The SLIF-S device 110 also monitors the integrity of the data by verifying the CRC inserted by the SLIF-M device 54b. it also extracts activity information from each stream to determine which stream originated with the active and inactive CEM. Data is always selected from the active CEM. The CEM activity states are known boy special indicator bits in serial data carried by S links 18. The indicator bits from a given S-link 18 are used in the selection algorithm only it the CRC for that stream indicates that the data is not corrupt. Thereafter, the serial streams are converted to ten-bit parallel streams or interleaved data. SLIF-S 110 then creates a single parallel data stream by selecting the active data inactive stream which is provided Lu resource module specific circuitry 112 via bus 120. The SLIF-S device 110 also extracts messaging data from both streams and forwards the messaging data to RM microprocessor 114 via bus 118.

Resource module specific circuitry 112 then processes the data as required by the RM.

A person skilled in the art will appreciate that numerous modifications to the preferred embodiment are possible. For example, the system way be scaled to allow different numbers of RMs or CRMs accommodating larger payloads. Similarly, the rate, number, payload capacity or format of S-links 18 or Host link 20 could be varied. For example, optical links could be used for Slinks. Similarly, the size of timeswitch 38 could be modified, or the granularity or size of the switches in the BWA could be altered. Similarly, bus sizes and messaging protocols within RMs 10 and CEM 12, 14 could be varied.

A further possible variation is to pro-vide an additional payload path between BWA 36a and 36b, acting as a shunt across a portion of timeswitch 38. This path would in effect operate as a portion of the timeswitch 38 with a fixed set of connections, useful for applications not requiring payload switching at granularities other than that of the BWA 36a and 36b. Since the frame alignments at the input so and output 82 of timeswitch 38 are approximately equal, this path could be economically implemented with a few latches. Payload switched through this path would not experience the frame buffering delay of timeswitch 38. In this scenario, the functions and purposes of the BWA 36a and 36b remain unchanged.

Those skilled in the art will further recognize that various modifications, and changes to the above described preferred embodiments are possible without departing from the spirit or scope of the invention as defined by the claims.

We claim:

1. A modular communications system comprising
   a control module;
   a plurality of resource modules, each resource module for at least one of
   i) receipt of payload data provided to said system; and
   ii) manipulation of received payload data;
   wherein at least one of said resource modules comprises a digital signal processor for processing payload data;
   plurality of resource module links, one link connecting each resource module to said control module;
   said control module comprising:
      a switch for switching payload data between said plurality of resource modules;
      a bandwidth allocator comprising a bandwidth selector and a bandwidth distributor each connected to said switch and to said resource module links;
      said bandwidth selector to pass a selected bandwidth of payload data from each of said resource modules to said switch; and
      said bandwidth distributor to pass a selected bandwidth of payload data from said switch to each of said resource modules.

2. The modular communications system of claim 1, wherein said switch comprises a time division multiplexed switch.

3. The modular communications system of claim 2 wherein each resource module link is isolated from every other resource module link.

4. The modular communications system of claim 3 wherein said payload data is channelized.

5. The modular communications system of claim 4 wherein said time division multiplexed switch is for switching individual 64 kbps channels of said payload data.

6. The modular communications system of claim 3 wherein said bandwidth selector further comprises
   a bandwidth selector switch for switching payload data provided to said bandwidth allocator before providing payload data to said resource modules.

7. The modular communications system of claim 3 wherein said bandwidth distributor further comprises
   a bandwidth distributor switch for switching payload data provided to said bandwidth allocator before providing payload data to said resource modules.

8. The modular communications system of claim 6 wherein said bandwidth selector switch switches multiple 64 kbps channels of said payload data.

9. The modular communications system of claim 8 wherein said bandwidth distributor switch switches multiple 64 kbps channels of said payload data.

10. The modular communications system of claim 9 wherein said multiple 64 kbps channels of payload data are interleaved.

11. The modular communications system of claim 3 further comprising
    a host interface for connecting said control module to a host communications system for transferring payload data between said control module and said host communications system.

12. The modular communications system of claim 11, wherein said host interface is connected to said bandwidth allocator, and said payload data is switched by said time division multiplexed switch, between said host and between any of said resource modules.

13. The modular communications system of claim 2 wherein said time switch is non-blocking.

14. The modular communications system of claim 1 wherein each said resource link comprises a serial data link.

15. The modular communications system of claim 3 further comprising a second control module;

a control module link between said control module and said second control module for the exchange of data between said control module and said second control module;

a second plurality of resource module links, one of said second plurality of resource module links connecting each resource module to said second control module;

and wherein said resource modules comprise means for selecting payload data from said second control module in the event of failure of said control module.

16. The modular communications system of claim 1 wherein said control module comprises a plurality of identical resource module interfaces, connected to said resource module links.

17. The modular communications system of claim 16 wherein each of said resource modules comprises a resource module interface for connection to said resource module links.

18. The modular communications system of claim 1 wherein said control module and each said resource module comprises independent processor means.

19. The modular communications system of claim 1 wherein said plurality of resource modules comprise active and redundant resource modules;

said control module further comprising means to switch between one of said active resource modules and a redundant module if said one of said active modules fails.

20. The modular communications system of claim 19 wherein said means to switch between one of said active resource modules and said redundant modules comprises said bandwidth allocator.

21. The modular communications system of claim 3 further comprising a data manipulator connected between said switch and said bandwidth distributor for applying unitary operations on payload data passed from said switch to said bandwidth distributor.

22. A modular communications system comprising:

a first switch for switching individual channels of payload data between a first switch input and a first switch output, each channel having a fixed bandwidth;

a second switch for switching payload data in groups of channels, between a second switch input and a second switch output, each group of channels provided to said second switch input from a link, and each group of channels comprising an integer number of at least two individual channels of payload data;

a third switch for switching payload data in groups of channels between a third switch input and a third switch output;

said second switch output interconnected with said first switch input, to provide payload data from said second switch to said first switch;

said first switch output interconnected with said third switch input, to provide payload data from said first switch to said third switch;

a plurality of resource modules each connected with at least one link to said second switch to provide payload data to said second switch, and to said third switch to receive payload data from said third switch at least one processor in communication with said second switch and said third switch to select groups of channels switched between said second switch input and said second switch output, and to select groups of channels switched between said third switch input and said third switch output.

23. The modular communication system of claim 22, wherein said first, second and third switches each comprise time division multiplexed switches.

24. The modular communications system of claim 22, wherein each channel has a bandwidth of 64 kbps.

25. The modular communications system of claim 22, wherein each of said links is identical.

26. The modular communications system of claim 22, wherein each of said plurality of resource modules is connected to said third switch by at least one of said links, carrying at least one group of channels of payload data to each of said resource modules.

27. The modular communications system of claim 26, wherein said third Switch is adapted to broadcast groups of channels at said third switch input to multiple links at said third switch output.

28. The modular communications system of claim 26, wherein at least one ol said plurality of resource modules is connected to said second switch and to said third switch by two of said links, carrying at least two groups of channels of payload data from and to said at least one of said plurality of resource modules.

29. The modular communications system of claim 22, wherein said second switch. has an aggregate switching capacity less than an aggregate switching capacity of said first switch, and wherein less than said aggregate capacity of said first switch is switched by said first switch to said input of said third switch.

30. The modular communications system of claim 24, wherein each group of channels comprises an equal integer number.

31. The modular communications system of claim 30, wherein said equal integer number comprises thirty-two.

32. A modular communications system comprising:

a control module;

a plurality of resource modules, each resource module for at least one of i) receipt of payload data provided to said system; and ii) manipulation of received payload data;

a plurality of resource module links, one link connecting each resource module to said control module;

said control module comprising a switch for switching payload data between said plurality of resource modules;

first means for passing a configured bandwidth of payload data from each of said resource modules to said switch;

second means for passing a configured bandwidth of payload data from said switch to each of said resource modules;

at least one processor in communication with said first and second means. to configure said first means to pass said configured bandwidth of payload data from each of said resource modules to said switch, and said second means to pass said configured bandwidth of payload data from said switch to each of said resource modules.

33. The modular communications system of claim 32, further comprising means to broadcast identical payload data from said switch to two or more of said plurality of resource modules.

34. The modular communications system of claim 32, wherein said plurality of links have an aggregate payload bandwidth greater than an aggregate payload switching capacity of said switch, and wherein said means for selecting provides a fraction of said aggregate payload bandwidth of said links to said switch.

35. A modular communications system comprising:
   first means for switching individual channels of payload data between a first input and first output, each channel having a fixed bandwidth;
   second means for switching channels of payload data in groups, between a second input and a second output, each group provided to said second input from one of a plurality of links and comprising an integer number of individual channels of payload data;
   third means for switching channels of payload data in groups, between a third input and a third output;
   said second output interconnected with said first input, to provide payload data from said second means for switching to said first means for switching;
   said first output interconnected with said third input, to provide payload data from said first means for switching to said third means for switching;
   a plurality of resource modules each connected with at least one of said links to said second means for switching to provide payload data to said second means for switching, and to said third means for switching to receive payload data from said third means for switching
   at least one processor in communication with said second means for switching and said third means for switching to configure said second means for switching to switch selected groups of payload data between said second input to said second output, and to configure said third means for switching to switch selected groups of payload data between said third input to said third output.

36. A method of switching data between a plurality of active and redundant resource modules in a communications system comprising a first, second and third switch, said method comprising the steps of:
   a. providing groups of channels of payload data from said active and redundant resource modules to said second switch;
   b. at said second switch, switching groups of channels of payload data Itoni active resource modules t o said first switch;
   c. at said first switch, switching individual channels of payload data at said first switch to said third switch;
   d. at said third switch, switching groups of payload data including payload data provided by said first switch, to said active and redundant resource modules, each group comprising an integer number of at least two individual channels of payload data.

37. The method of claim 36, wherein step d. further comprises broadcasting payload data switched to active resource modules to corresponding redundant resource modules.

38. The method of claim 36, wherein each group of channels comprises ring equal integer number.

39. The method of claim 38, wherein said equal integer number comprises thirty-two.

40. A modular communications system comprising:
   a control module;
   a plurality of resource modules, each resource module for at least one of
   i) receipt of payload data provided to said system; and
   ii) manipulation of received payload data;
   a plurality of resource module links, one link connecting each resource module to said control module;
   said control module comprising:
      a switch for switching payload data between said plurality of resource modules;
      a bandwidth allocator comprising a bandwidth selector and a bandwidth distributor each connected to said switch and to said resource module links;
      said bandwidth selector to pass a selected bandwidth of payload data from each of said resource modules to said switch; and
      said bandwidth distributor to pass a selected bandwidth of payload data from said switch to each of said resource modules;
      at least one processor in communication with said bandwidth selector and said bandwidth distributor, to configure said bandwidth selector to pass said selected bandwidth of payload data from each of said resource modules to said switch and to configure said bandwidth distributor to pass said selected bandwidth of payload data from said switch to each of said resource modules.

41. The modular communications system of claim 1, wherein said digital signal processor is adapted to perform at least one of: tone generation; echo cancellation; data compression; and voice recognition.

42. The modular communications system of claim 1, further comprising:
   at least one processor in communication with said bandwidth selector and said bandwidth distributor, to configure said bandwidth selector to pass said selected bandwidth of payload data from each of said resource modules to said switch and to configure said bandwidth distributor to pass said selected bandwidth of payload data from said switch to each of said resource modules.

43. The modular communications system of claim 22, wherein at least one of said resource modules comprises a digital signal processor.

44. The modular communications system of claim 32, wherein at least one of said resource modules comprises a digital signal processor.

* * * * *